United States Patent [19]
Grey

[11] 3,946,636
[45] Mar. 30, 1976

[54] TOGGLE BOLT
[75] Inventor: Frederick R. Grey, Belleuve Heights, Australia
[73] Assignee: Omark Industries, Inc., Portland, Oreg.
[22] Filed: Dec. 2, 1974
[21] Appl. No.: 528,791

[52] U.S. Cl. .................................. 85/3 S; 85/3 R
[51] Int. Cl.² ...................................... F16B 35/04
[58] Field of Search .................... 85/35, 3 K, 3 R

[56] References Cited
UNITED STATES PATENTS

| | | | |
|---|---|---|---|
| 1,658,959 | 2/1928 | Zifferer | 85/3 R |
| 2,519,511 | 8/1950 | Stelter; | 85/3 R |

FOREIGN PATENTS OR APPLICATIONS

| | | | |
|---|---|---|---|
| 130,259 | 11/1948 | Australia | 85/3 R |
| 1,296,883 | 6/1969 | Germany | 85/3 R |

Primary Examiner—Roy D. Frazier
Assistant Examiner—Rodney H. Bonck
Attorney, Agent, or Firm—Robert L. Harrington

[57] ABSTRACT

A toggle bolt to be used, for example, to fasten components to a ceiling. The toggle bolt includes a bolt portion and a sleeve portion. The bolt portion is of standard construction and includes an elongated threaded shank and a head portion. The sleeve portion includes a threaded nut pivotally mounted within the sleeve. The sleeve is slotted on one end so that the bolt can be threaded into the nut and then positioned either aligned or crosswise relative to the sleeve. A leaf spring portion in the sleeve biases the sleeve into the crosswise position so that the aligned position is maintained only while the sleeve is pushed through a hole in the ceiling and upon clearing the hole assumes the crosswise position.

1 Claim, 4 Drawing Figures

U.S. Patent    March 30, 1976    3,946,636
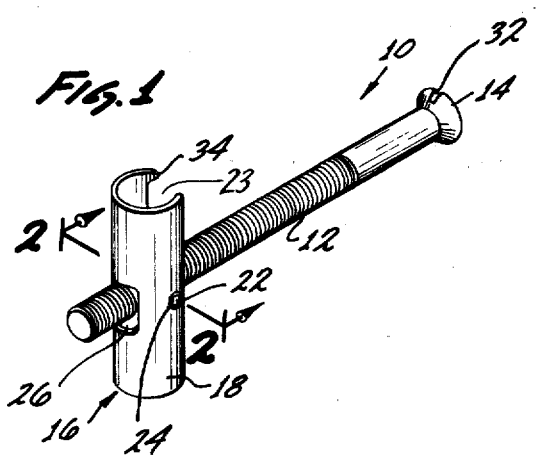
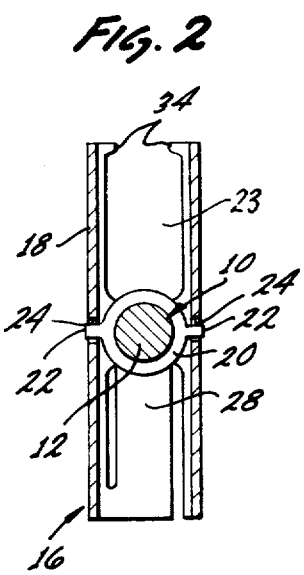
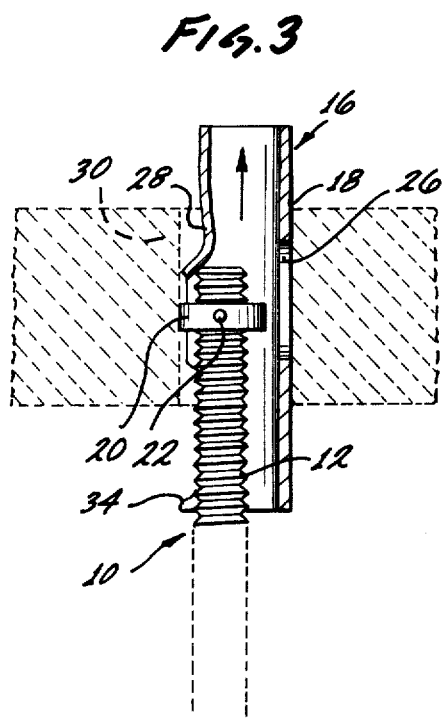
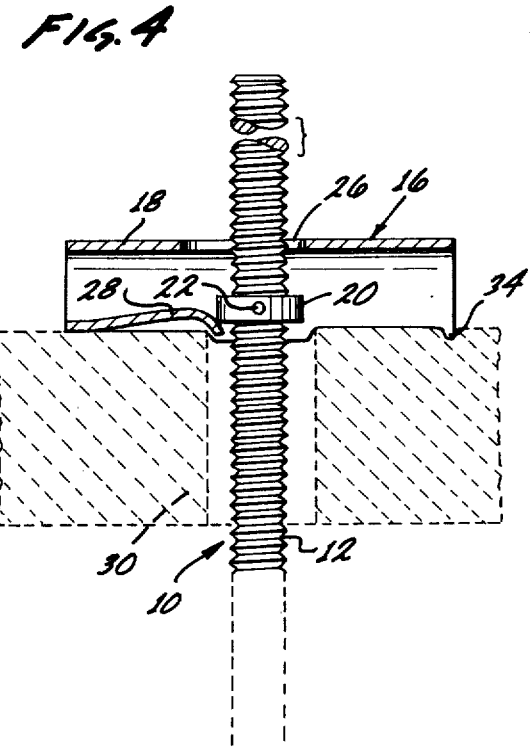

TOGGLE BOLT

HISTORY

This invention relates to fasteners and particularly to toggle bolts which are inserted through an opening in a wall or ceiling. A sleeve portion carried by the bolt assumes a crosswise position relative to the opening whereby withdrawal of the toggle bolt through the opening is prevented.

Fasteners for fastening components to ceilings and walls are used extensively in the construction trade as well as being used by the novice homeowner for attaching hanging lamps and the like. It is desirable in such fastening applications to provide a fastener which can be securely anchored to the ceiling or wall with the least amount of defacing of the surface and with the least effort and expertise being required. Thus, a type of fastener that has become very popular is referred to as the toggle bolt. The toggle bolt typically includes a conventional bolt-like member including a threaded shank and screw head and a member which carries a nut through which the bolt is screwed. This member is adapted to fold against the bolt so as to assume a small circular cross-section to be inserted through a hole drilled into the ceiling or wall but which either expends or becomes dislodged crosswise relative to the bolt when the member is shoved through the opening. Typically, the member is composed of several parts including pivotal wing-like members biased by springs.

Toggle bolts which are especially adapted to be fastened to walls can use gravity force rather than springs to pivot a sleeve after it is inserted through the opening. This sleeve is weighted on one end and thus after shoving the sleeve through the wall opening, the sleeve will swing into a crosswise position by gravity action. This latter type of toggle bolt has the advantage of requiring fewer parts and thus is cheaper to construct and because of the simpler action is more reliable.

The present invention is intended to duplicate the simplicity of the sleeve-like toggle bolt above described for wall applications but adapt for use in ceilings. Very briefly, a sleeve element has a leaf spring section formed into the wall of the sleeve which urges the bolt to its crosswise position. The sleeve is first forced into alignment with the bolt, shoved through an opening in the ceiling and by action of the leaf spring, the sleeve is pivoted into its crosswise position. Having thus briefly explained the invention, the invention will be more fully understood by reference to the following detailed description and drawings wherein:

FIG. 1 is a perspective view of a toggle bolt utilizing the present invention;

FIG. 2 is a section view taken on section lines 2-2 of FIG. 1;

FIG. 3 is a section view of the fastener of FIG. 1 shown as it is being inserted through an opening in a ceiling; and FIG. 4 is a view similar to FIG. 3 but showing the sleeve of the bolt having been fully inserted through the ceiling opening and positioned crosswise with respect to the bolt.

Referring to the drawings, a bolt 10 has a threaded shank 12 and a head 14. A toggle member 16 includes a sleeve 18 and a nut 20. As will be noted particularly in FIG. 2, the nut 20 has projections forming pivot posts 22. Apertures 24 in the side wall of the sleeve 18 provide the bearings for the pivot posts 22. A section at one end of the sleeve is removed to provide a slot 23 to permit the bolt, when partially screwed into the nut 20, to be pivoted relative to the sleeve. This relative positioning is noted by reference to FIGS. 1 and 4 where the sleeve is in a crosswise position as compared to the aligned position shown in FIG. 3. An aperture 26 in the sleeve permits the bolt to be extended through the sleeve, again as shown in FIGS. 1 and 4.

Whereas the above features are not unique to toggle bolt fasteners, the improvement provided by the present invention resides in the leaf spring 28. The leaf spring 28 as shown is formed out of a second slot in the sleeve 18 that is in alignment with the slot 23 and on the opposite end of the sleeve. The leaf spring 28 thus projects inwardly of the sleeve wall into the path of the bolt 10 as it is screwed through the nut 20. Thus with the sleeve 18 pivoted into alignment with bolt 10 and screwed partially through the nut 20 so as to contact the leaf spring 28 as shown in FIG. 3, the leaf spring 28 bears against the bolt and urges the sleeve into its crosswise position. It will be understood that with the bolt screwed out of engagement with the leaf spring 28, the bolt has free pivotal movement relative to the sleeve.

It will be apparent from the above and with particular reference to the drawings that the illustrated toggle bolt is utilized by first drilling a hole in a ceiling 30 just large enough to receive the sleeve 18. With the bolt 10 and sleeve 18 held in their aligned position, the sleeve is inserted through the hole as indicated by the arrow in FIG. 3. When the sleeve 18 is extended completely through the hole the leaf spring 28 urges pivoting of the sleeve 18 and in the resulting crosswise position cannot be withdrawn through the hole. In this crosswise position, as shown in FIG. 4, the leaf spring 28 is disengaged from the bolt. With the use of a screwdriver applied to the slot 32 in the head 14 of the bolt, the bolt can be screwed through the nut 20 as desired without contact or interference with the leaf spring 28. While friction alone will tend to hold the sleeve against turning with the bolt, finger-like extensions 34 are provided to grip the ceiling 30 to insure non-turning of the sleeve.

While the above described toggle bolt fastener illustrates the preferred embodiment of the invention, others skilled in the art will conceive of various modifications and deviations without departing from the inventive concept. Thus, the invention is not limited to the embodiment shown but is extended in scope as determined by the claims appended hereto.

What is claimed is:

1. A toggle bolt comprising; a bolt having a head and threaded shank, a toggle member including a sleeve, a nut pivotally mounted within the sleeve and intermediate its ends adapted to received the threaded shank of the bolt, said sleeve having a first slot in one end thereof to permit pivoting of the bolt when engaged with the nut from a first position aligned with the sleeve and a second position crosswise of the sleeve, a leaf spring integrally formed out of a second slot formed in the sleeve, said leaf spring being on the side of the nut opposite the first slot and projected into the sleeve and into the path of the bolt in said first position, said leaf spring acting against the end of the bolt projected through the nut and into contact with the leaf spring to urge the bolt toward its second position, and said bolt adapted to be screwed out of contact with the leaf spring for free swinging pivotal movement between said first and second positions.

* * * * *